(12) United States Patent
Drake

(10) Patent No.: US 9,714,178 B2
(45) Date of Patent: Jul. 25, 2017

(54) METHOD FOR SELECTIVELY REMOVING SILICA FROM STRONG BRINES USING ACTIVATED ALUMINA

(71) Applicant: Drake Water Technologies, Inc., Helena, MT (US)

(72) Inventor: Ronald N. Drake, Helena, MT (US)

(73) Assignee: Drake Water Technologies, Inc., Helena, MT (US)

( * ) Notice: Subject to any disclaimer, the term of this patent is extended or adjusted under 35 U.S.C. 154(b) by 243 days.

(21) Appl. No.: 14/604,067

(22) Filed: Jan. 23, 2015

(65) Prior Publication Data

US 2015/0203367 A1    Jul. 23, 2015

Related U.S. Application Data

(60) Provisional application No. 61/930,868, filed on Jan. 23, 2014.

(51) Int. Cl.
*C02F 1/28* (2006.01)
*B01D 15/02* (2006.01)
(Continued)

(52) U.S. Cl.
CPC .............. *C02F 1/281* (2013.01); *B01D 15/02* (2013.01); *B01J 20/08* (2013.01);
(Continued)

(58) Field of Classification Search
CPC .. C02F 1/281; C02F 2101/10; C02F 2209/03; C02F 2209/06; C02F 2303/16; B01D 15/02; B01J 20/08
See application file for complete search history.

(56) References Cited

U.S. PATENT DOCUMENTS 4,276,180 A * 6/1981 Matson .................... C02F 1/281
                                                     210/683
6,716,344 B1 * 4/2004 Bassi ...................... B01D 15/02
                                                     210/189

(Continued)

FOREIGN PATENT DOCUMENTS

AU    WO 2014153623 A1 * 10/2014 .............. C02F 1/281

OTHER PUBLICATIONS

ASTM International, "Standard Test Method for Silica in Water", Jun. 10, 2000, p. 5, Published in: US.

(Continued)

*Primary Examiner* — Matthew O Savage
(74) *Attorney, Agent, or Firm* — Neugeboren O'Dowd PC

(57) ABSTRACT

Treatment of silica-laden wastewater is herein described. Unlike traditional fixed bed designs that cannot use an activated alumina sorbent due to the high volumes of sorbent needed in a fixed bed design, the herein disclosed continuous cycle enables smaller volumes of sorbent to be used and thereby enabling activated alumina to be used. Adsorption, regeneration, and rinse regions are provided. Activated alumina is provided to the adsorption region along with silica-containing wastewater. A pH below the zero point charge for alumina is set, and this causes the silica to load onto the alumina. Gravity brings the loaded alumina to the regeneration region, having a pH equal to or greater than the zero point charge of alumina such that the silica is released from the alumina. The silica and alumina are further separated in the rinse region, and the regenerated alumina can then be returned to the adsorption region.

10 Claims, 11 Drawing Sheets

(51) Int. Cl.
*B01J 20/08* (2006.01)
*C02F 101/10* (2006.01)

(52) U.S. Cl.
CPC .... *C02F 2101/10* (2013.01); *C02F 2209/006* (2013.01); *C02F 2209/008* (2013.01); *C02F 2209/03* (2013.01); *C02F 2209/06* (2013.01); *C02F 2303/16* (2013.01)

(56) References Cited

U.S. PATENT DOCUMENTS

2011/0163038 A1\* 7/2011 Drake ................ B01J 47/10
210/676
2011/0203928 A1\* 8/2011 Petko ................ C02F 1/281
204/536

OTHER PUBLICATIONS

Bouguerra, et al., "Equilibrium and kinetic studies of adsorption of silica onto activated alumina", Feb. 16, 2006, p. 141, Publisher: Elsevier BV, Published in: US.
Chick, et al., "Glass Leaching Performance", May 1983, p. 64, Publisher: Battelle, Published in: US.
Icopini, et al., "Kinetics of silica oligomerization and nanocolloid formation as a function of pH and ionic strength at 25C,", Jun. 25, 2004, p. 11, Publisher: Elsevier BV, Published in: US.
Schlottmann, "Soluble Silicates", Apr. 20, 2004, p. 311, Publisher: UNEP Publications, Published in: DE.

\* cited by examiner

METHOD FOR SELECTIVELY REMOVING SILICA FROM STRONG BRINES USING ACTIVATED ALUMINA

CROSS REFERENCE TO RELATED APPLICATIONS

The present application for patent claims priority to Provisional Application No. 61/930,868 entitled "METHODS AND APPARATUS FOR SELECTIVE REMOVAL OF SILICA FROM STRONG BRINES" filed Jan. 23, 2014, and assigned to the assignee hereof and hereby expressly incorporated by reference herein.

BACKGROUND

Field of the Disclosure

The present disclosure relates generally to water treatment. In particular, but not by way of limitation, the present disclosure is related to treatment of wastewater having high total dissolved solids.

Description of Related Art

The presence of silica in feed waters greatly complicates and increases the costs of operating many systems used for energy recovery and industrial water and wastewater treatment.

Silica forms intractable scale deposits on heat transfer surfaces and other surfaces or membranes where aqueous streams containing silica are concentrated. Most notably, reduced performance and failure of boilers, steam generators, turbines, evaporators, cooling towers, and reverse osmosis treatment systems are attributed to formation of intractable silica scale. Replacement of silica fouled equipment is often less costly than efforts to clean or remove the offending silica scale.

One theoretical method for silica removal is via adsorption on activated alumina in a fixed bed system. However, those of skill in the art are well aware that since activated alumina is a surface-oriented process, very little silica can be loaded onto each alumina particle, and hence vast volumes of alumina would be required in the fixed bed in order to implement any commercial silica treatment solution. As such, this approach has not been pursued by those of skill in the art.

Instead, various methods have been used to treat silica-laden liquids, each having their own drawbacks. For instance, the most common treatments are demineralization, hot lime softening, magnesium addition and coagulation, and sodium aluminate coagulation. Each of these treatments are complex, expensive, and generate large quantities of intractable by-product wastes.

Furthermore, although ion exchange processes can be used to remove ionic species, in most target water streams, which have a near-neutral pH, silica is present as non-ionic species and thus not amendable to ion-exchange treatment.

SUMMARY

The present disclosure relates to systems, methods and apparatuses for selective removal of silica in brines with high total dissolved solids where silica may be present in one or more forms of silicic acid including, but not limited to, ionic and neutral monosilicic acid together with their condensation oligomers, polymers, and colloids.

One aspect of the disclosure is a wastewater treatment system comprising an adsorption region, a regeneration region, and a rinse region. The regeneration region can be in fluid communication with an output of the adsorption region and arranged at a lower elevation than the adsorption region. The rinse region can be in fluid communication with an output of the regeneration region and arranged at a lower elevation than the regeneration region. This arrangement enables a sorbent to move from the adsorption region to the regeneration region to the rinse region under the influence of gravity. The system further can include a solids transport path coupled between a bottom of the rinse region and a top of the adsorption region. The system further can include a treated water output line coupled to an upper half of the adsorption region and having a subline coupled to the solids transport path. The coupling to the solids transport path is such that part of the treated water exiting the adsorption region can be used to push regenerated alumina through the solids transport path and back up to a top of the adsorption region. The system can yet further include a feed water input line coupled to a lower half of the adsorption region. The system also can include a rinse water input line coupled to a lower half of the rinse region. Additionally, the system can include a regenerant input line coupled to a lower half of the regeneration region. Finally, the system can include a waste fluid output line coupled proximal to an interface between the adsorption region and the regeneration region.

In another aspect of the disclosure, a continuous-cycle method of wastewater treatment via reduced volumes of alumina is described. The method can include providing activated alumina and a silica-containing waste fluid to a top region of a waste treatment vessel. The method can also include setting a pH of the top region to a pH less than a point of zero charge of the activated alumina. The method can yet further include removing silica from the silica-containing waste fluid via countercurrent mixing of the waste fluid with the activated alumina to form silica-loaded alumina and treated water in the top region. And further, the method can include removing the treated water from the top region and providing the silica-loaded alumina to a second region. The method can additionally include setting a pH of the second region to be greater than or equal to the point of zero charge of the silica-loaded alumina and thereby releasing the silica from the silica-loaded alumina via the pH of the second region. This reestablishes the activated alumina which can then be returned to the top region of the waste treatment vessel.

DETAILED DESCRIPTION

The inventor recognized that although alumina adsorption of silica seemingly requires vast quantities of alumina to be effective, use of a unique continuous cycle loop including adsorption and regeneration regions could enable alumina adsorption to be used with far less alumina than previously thought possible (e.g., see the enclosed comparison of the disclosed SilFlo process to a conventional fixed bed approach and the order of magnitude decrease in required alumina volume achieved herein). This disclosure presents systems and methods for silica removal from high-TDS water via a continuous cycle activated alumina surface adsorption scheme. The use of a continuous cycle system enables continuous regeneration of a much smaller volume of alumina. Further, a continuous cycle can be used by careful adjustment to the pH at different points in the continuous cycle such that silica and activated alumina are attracted to each other during an adsorption region of the cycle and far less attracted (or even repulsed) during a regeneration region of the continuous cycle. The physical chemistry of the adsorption region of the continuous cycle is based on electrostatic attraction and binding of anionic (electronegative) monovalent silicic acid on the electropositive surfaces of activated alumina. A pH is preferred in an adsorption region of the cycle that is high enough to ionize silicic acid and form anionic silica, yet low enough for alumina to have an electropositive surface charge and thus able to adsorb the anionic silica. Specifically, the pH is preferably below alumina's point of zero charge (PZC) in the adsorption region of the cycle. Regeneration is achieved by raising the pH such that alumina becomes sufficiently neutral or raising the pH above the PZC so that the alumina is electronegative and repels the adsorbed silica. Once separated, the silica can be removed in the regeneration region of the cycle and fresh activated alumina can be returned to the adsorption region for further loading of silica from untreated liquids.

The point of zero charge (PZC) for alumina is variously reported as being in the pH range from 8.5 to 9.5 or 8.7 to 9.0. Below the PZC, the alumina surface exhibits a positive charge which attracts and holds anionic silica species. Anionic silica species can typically be formed when the pH is raised above about 8.0. Thus, the adsorption cycle can be preferably operated at pH between 8.0 and 8.5 or between 8.0 and 8.7. At such a pH, anionic monovalent silicic acid is quickly generated at the same time that it is rapidly being adsorbed by the electropositive alumina. The pH can be tailored such that anionic silica is adsorbed at a rate equal to or greater than a rate at which silicic acid is ionized into anionic silica.

Figure 1:
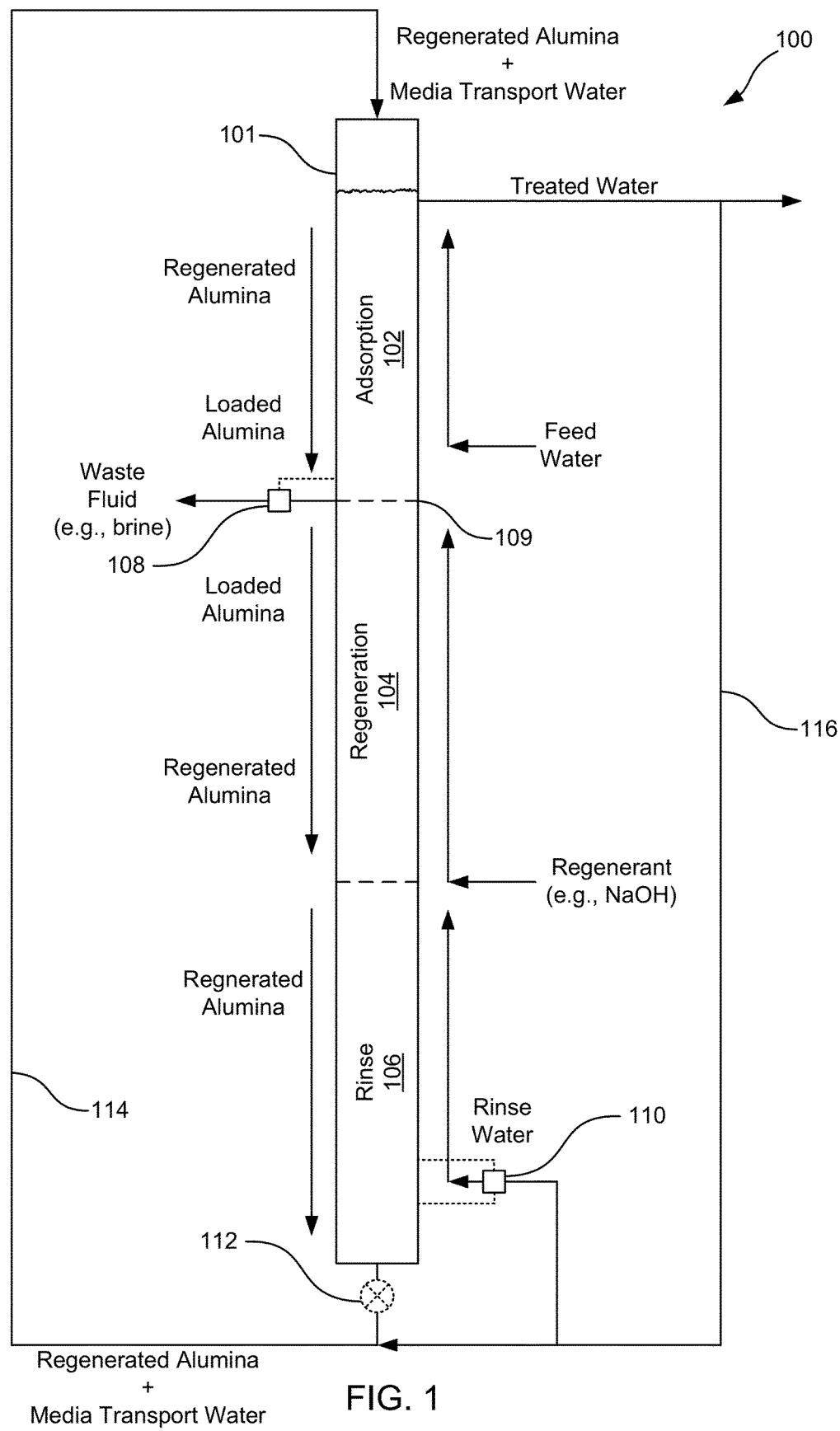
FIG. 1 illustrates one embodiment of a system for performing continuous cycle silica adsorption and alumina regeneration.

FIG. 1 illustrates one embodiment of a system for performing continuous cycle silica adsorption and alumina regeneration. The illustrated system includes an elongated vessel 101 comprising an adsorption region 102, a regeneration region 104, and a rinse region 106. Both the regeneration region 104 and the rinse region 106 can be considered part of a regeneration process. Each of the three regions 102, 104, 106 can be in fluid communication with a next and previous region 102, 104, 106 such that solid sorbent passes through the system in a continuous cycle. The adsorption region 102 is arranged at a higher elevation than the regeneration region 104, and the regeneration region 104 is arranged at a higher elevation than the rinse region 106. This arrangement enables a sorbent (e.g., activated alumina) to descend from the adsorption region 102 to the regeneration region 104 to the rinse region 106 under the influence of gravity. While pumps may be used to encourage this movement, they are not needed.

Activated alumina pellets are circulated through the elongated vessel 101, in a slowly descending packed bed under the influence of gravity (although other forms of transport are envisioned in alternative embodiments). Alumina can be discharged from the bottom of the elongated vessel 101 (e.g., via an optional valve 112 such as a rotary valve), and then transported back to a top of the elongated vessel 101 via a solids transport path 114. For instance, the solids transport path 114 can include a fluid eductor or fluid educator pump.

Feed water, or contaminated water to be treated, can be introduced at a lower end of the adsorption region 102. For instance, the feed water can be introduced at a bottom of the adsorption region 102, but is preferably introduced between a bottom of the adsorption region 102 and a middle of the adsorption region 102 (e.g., proximal to a bottom of the adsorption region 102 or in a lower half of the adsorption region 102). Regenerated alumina, along with media transport water, enter the elongated vessel 101 from the top of the adsorption region 102 and comingle with the feed water moving upward in the elongated vessel 101. This comingling can comprise counter current mixing. Whatever the means of comingling, silica in the feed water is adsorbed on the alumina while the regenerated alumina and feed water comingle or mix in the adsorption region 102. As the regenerated alumina continues to move downward and continues to load with silica from the feed water, the now mostly or fully treated feed water comingles with the media transport water and the combination is discharged at or near a top of the adsorption region 102 as treated water (e.g., proximal to a top of the adsorption region 102 or in an upper half of the adsorption region 102).

A regenerant (e.g., NaOH solution) can be introduced into the lower end of the regeneration region 104. Regenerant solution flows counter-currently to the descending alumina (partially or fully loaded) and exits the elongated vessel 101, along with the silica, via a waste fluid output line located between the adsorption region 102 and the regeneration region 104 of the elongated vessel 101 (or proximal to this interface). In an embodiment, the waste fluid output line allows brine to be discharged from the elongated vessel 101 and can therefore comprise a brine discharge collector. The waste output line can comprise active or passive components. For instance, one embodiment includes a waste fluid flow control 108 that controls a rate of waste fluid (or brine) discharge. In one embodiment, the waste fluid flow control 108 includes a concentration indicator controller (CIC) that senses a concentration of the adsorption region 102 at a location above an interface between the adsorption and regeneration regions 102, 104. In an embodiment, the waste fluid flow control 108 can receive data from a pH probe coupled to the adsorption region 102 and use this data to control the flow of waste fluid exiting the elongated vessel 101. In particular, the CIC can monitor a pH at or near the interface 109 and adjust the brine discharge in order to remove sufficient regenerant to prevent the regenerant from rising and mixing with the feed-water. In one embodiment, the waste fluid flow control 108 can comprise a metering pump and a regenerant distributor.

Rinse water can be introduced at a lower end of the rinse section 106, which will then flow upward, countercurrently to the descending alumina, and will comingle with regenerant entering proximal to an interface between the regeneration and rinse regions 104, 106.

The alumina, moves downward through the vessel under the force of gravity, passing through the adsorption region 102, the regeneration section 104, and then the rinse section 106 before being hydraulically transported back up to the top of the elongated vessel 101 via the solids transport path 114. In an embodiment, the solids transport path 114 is coupled to the exiting treated water such that the treated water helps move the solids in the solids transport path 114 back to a top of the elongated vessel. The exiting treated water can be partially transported to the solids transport path 114 via a treated water subline or path 116. This portion of the treated water can be used to assist in moving the regenerated alumina from a bottom of the rinse region 106 to a top of the adsorption region 102. Movement of this portion of the treated water along the treated water subline or path 116 may be assisted by a pump or gravity, although a pump is not required. The treated water subline or path 116 can meet the solids transport path 114 at a point proximal to a bottom of the rinse region 106 or an output of the rinse region 106. Alternatively, this intersection can take place at a location proximal to or after the optional valve 112.

A rinse water flow control 110 can regulate a flow rate of rinse water into the rinse region 106. The rinse water flow control 110 can include a differential pressure (DP) or other sensor that can detect a pressure difference between two points in the elongated vessel 101, for instance two points in the rinse region 106, and instruct the rinse water flow control 110 to control an amount of rinse water entering the elongated vessel 101 to ensure that there is increasing pressure the deeper in the elongated vessel 101 measurements are taken and thus to ensure that fluids continue to move upward in the elongated vessel 101.

In an embodiment, an optional valve 112, such as a rotary valve at a bottom of the elongated vessel 101 can be used to ensure that primarily solids (alumina) pass down through the valve 112, and liquids pass primarily up through the valve 112. As such, the net flow of fluids through the valve 112 is upward while a net flow of solids is down through the valve 112. This optional valve 112 does not require an energy source, although one can be provided, but rather operates purely under the force of gravity. In some embodiments, the valve 112 can comprise a rotary valve used in combination with a knife gate.

As noted variously in the preceding paragraphs, the elongated vessel 101 is fitted with fluid distributors for introduction of feed water, regenerant solution, and rinse water. The feed water can enter the adsorption region 102, at a lower half of the adsorption region 102, or proximal to a bottom of the adsorption region 102. In an alternative, the feed water can enter via a feed water input line coupled to the adsorption region 102 proximal to a bottom of the adsorption region 102 or at a lower half of the adsorption region 102. The regenerant solution can enter the rinse region 106, the regeneration region 104, an interface between the rinse and regeneration regions 106, 104, between the rinse and regeneration regions 106, 104, at a lower half of the regeneration region 104, or proximal to a bottom of the regeneration region 104. Alternatively, the regenerant solution can enter via a regenerant input line arranged proximal to the rinse region 106, the regeneration region 104, an interface between the rinse and regeneration regions 106, 104, between the rinse and regeneration regions 106, 104, at a lower half of the regeneration region 104, or proximal to a bottom of the regeneration region 104. The rinse water can enter at the rinse region 106, a lower half of the rinse region 106, or proximal to a bottom of the rinse region 106. In an alternative, the rinse water can enter via a rinse water input line coupled to the rinse region 106 proximal to a bottom of the rinse region 106 or at a lower half of the rinse region 106.

Also as previously mentioned, the elongated vessel 101 is fitted with fluid removal components for removal of treated water and waste fluid (e.g., brine and/or regenerant). The treated water can exit the elongated vessel 101 via the adsorption region 102, at an upper half of the adsorption region 102, or proximal to a top of the adsorption region 102. In an alternative, the treated water can exit via a treated water output line coupled to the adsorption region 102, at an upper half of the adsorption region 102, or proximal to a top of the adsorption region 102. The waste fluid can exit the elongated vessel 101 via the regeneration region 104, the adsorption region 102, an interface between the adsorption and regeneration regions 102, 104, between the adsorption and regeneration regions 102, 104, a lower half of the adsorption region 102, proximal to a bottom of the adsorption region 102, an upper half of the regeneration region 104, or proximal to a top of the regeneration region 104.

While the elongated vessel 101 is here shown and described as a single vessel, in other embodiments it can include two or more vessels. For instance, each of the adsorption, regeneration, and rinse regions, 102, 104, 106 can be in separate vessels with fluid pathways connecting them. In other embodiments, the adsorption and regeneration regions 102, 104 can be in a first vessel while the rinse region 106 is in a second vessel. Further, while the elongated vessel 101 has a rectangular shape, other shapes such as cylinder and bulbous shapes, to name just two examples, can also be implemented. Three non-limiting examples of variations on the elongated vessel 101, or the adsorption region 102, can be seen in FIGS. 5-7. In one embodiment, the elongated vessel 101 and the solids transport path 114 can be implemented in a single vessel (e.g., see FIG. 4). In other words, the entirety of system 100 can be embodied in a single vessel.

Along similar lines, while the elongated vessel 101 has been shown with a fluid interface 109 between the adsorption region 102 and the regeneration region 104, and a second fluid interface 111 between the regeneration region 104 and the rinse region 106, in other embodiments one or both of these interfaces 109, 111 may be physical or structural interfaces (e.g., a valve).

Use of a continuous cycle as described enables control of an amount of silica removed from the feed stream as compared to fixed bed solutions, which are unable to control an amount or rate of silica removed from a feed stream.

Figure 4:
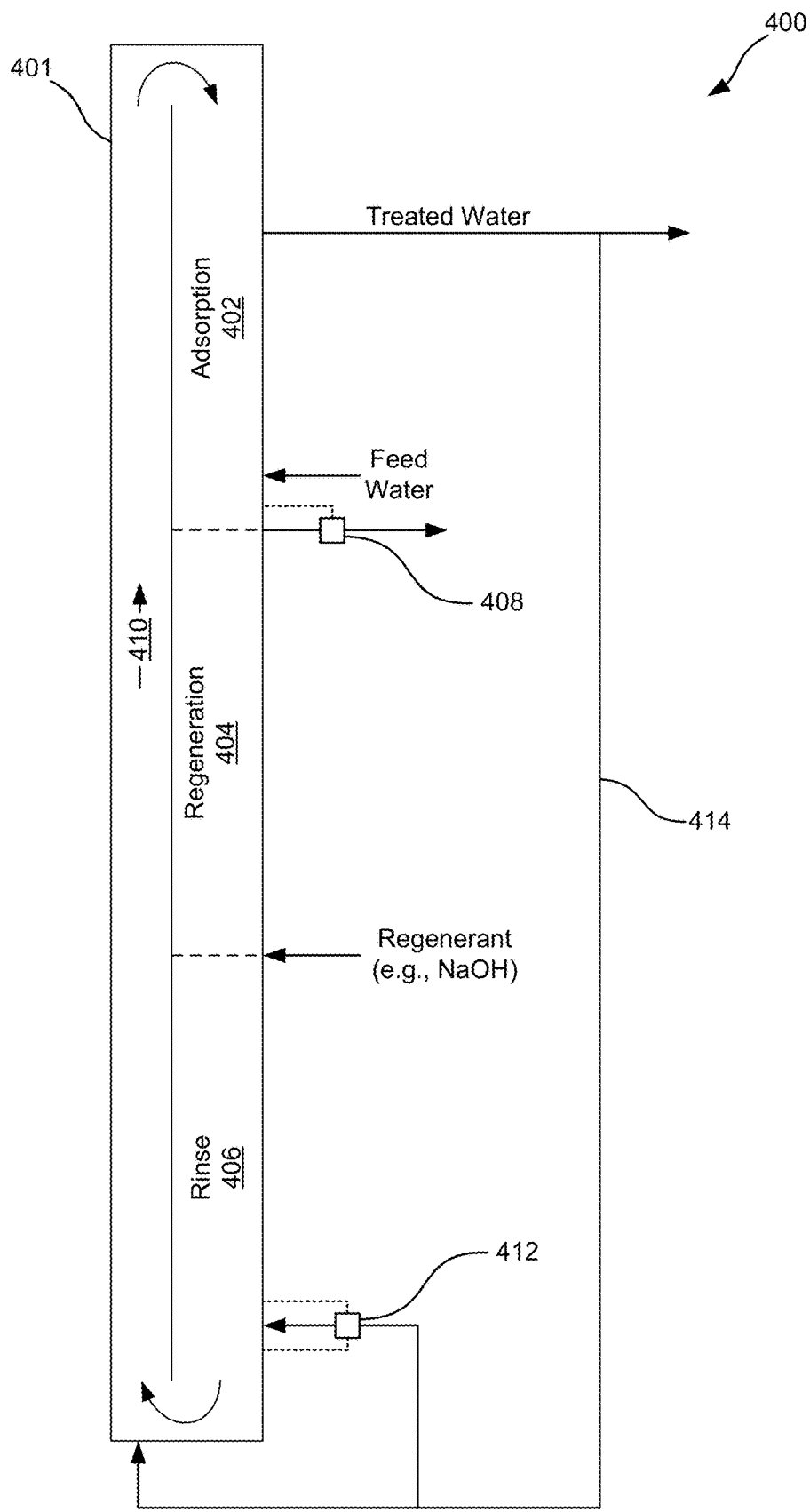
FIG. 4 illustrates an embodiment of a system for implementing the functionality described relative to FIG. 1.

FIG. 4 illustrates an embodiment of a system for implementing the functionality described relative to FIG. 1. The system 400 includes a vessel 401 having an adsorption region 402, a regeneration region 404, a rinse region 406, and a solids transport path 410. Activated alumina and media transport water enter from a top of the vessel 401 and descend through the adsorption region 402. Feed water enters at or near a bottom of the adsorption region 402 and rises thereby comingling with the activated alumina in the adsorption region 402. A pH of the adsorption region 402 is controlled such that silica from the feed water adsorbs to the activated alumina. Treated water results from this loading of the activated alumina and is removed from the adsorption region 402 near a top of the adsorption region. The loaded alumina descends through the regeneration region 404 where it comingles with regenerant that enters near a bottom of the regeneration region 404. The regenerant changes a pH of the regeneration region 404 such that the silica separates from the alumina. The regenerant is removed via a waste fluid output line at or near an interface between the adsorption and regeneration regions 402, 404. The rate of this removal can be controlled via a waste fluid flow control 408 that can include a pH sensor measuring a pH of the adsorption region 402. The alumina, now separated from the silica, continues to descend under the force of gravity into and through the rinse region 406. Rinse water enters near a bottom of the rinse region 406 and the rate of entry is controlled via a rinse water flow control 412 that may include a differential pressure sensor that measures a pressure difference in the rinse region 406. The rate of fluid passing through the rinse water flow control 412 can be adjusted to maintain a desired pressure differential in the rinse region 406. When the alumina reaches a bottom of the elongated 101, it returns to a top and to a top of the adsorption region 402 via the solids transport path 410. Optionally, a bottom of the vessel 401 can include a valve, such as a rotary valve, to enhance the separation of solids and fluids. The treated water can be partially fed back to the vessel 401 via a treated water subline 414 in order to assist in transport of the alumina along the solids the solids transport path 410.

Figure 5:
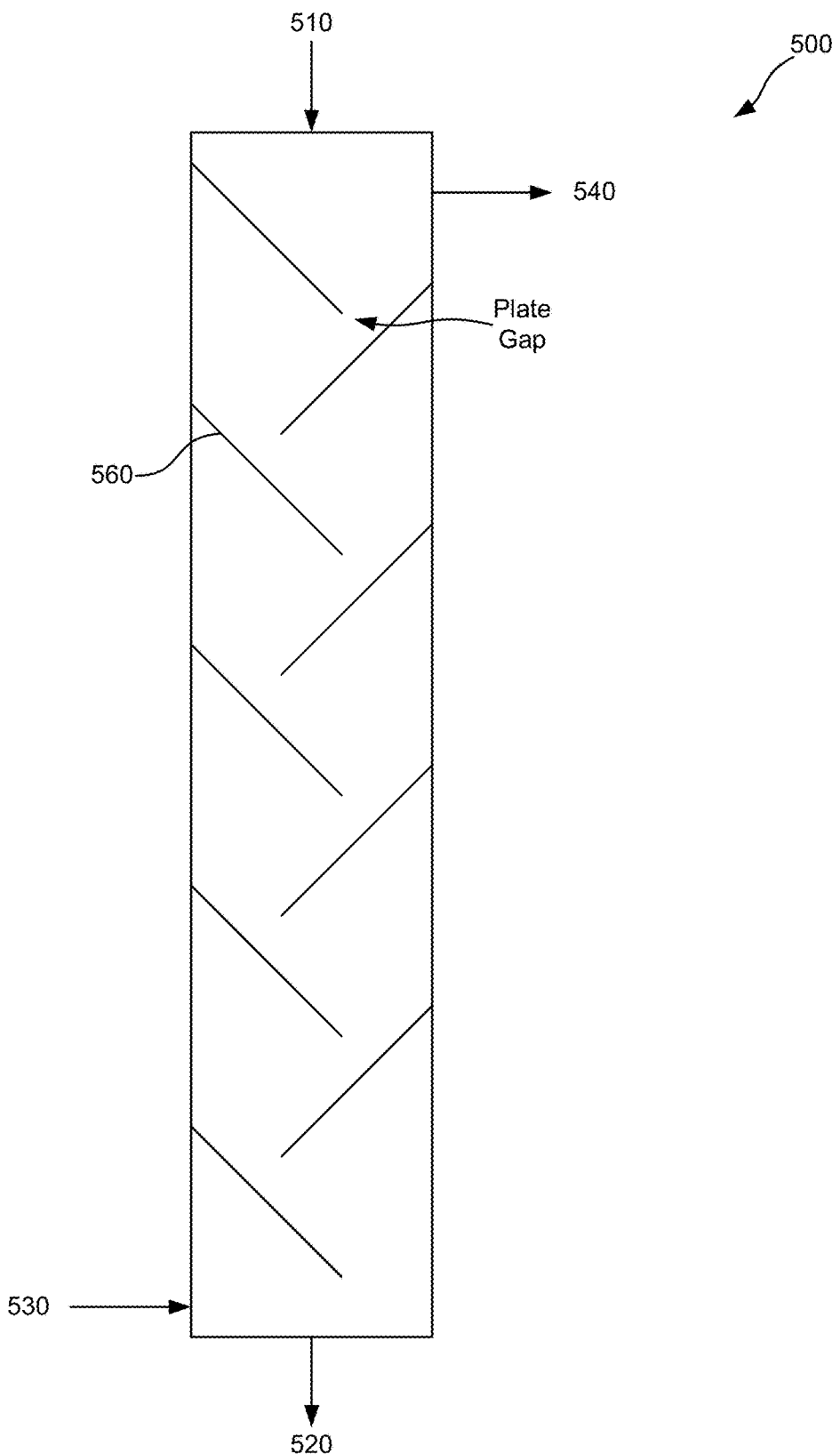
FIG. 5 illustrates a contacting chamber fitted with inclined plates 560 installed at an angle greater than the transport angle of the sorbent media.
Figure 6:
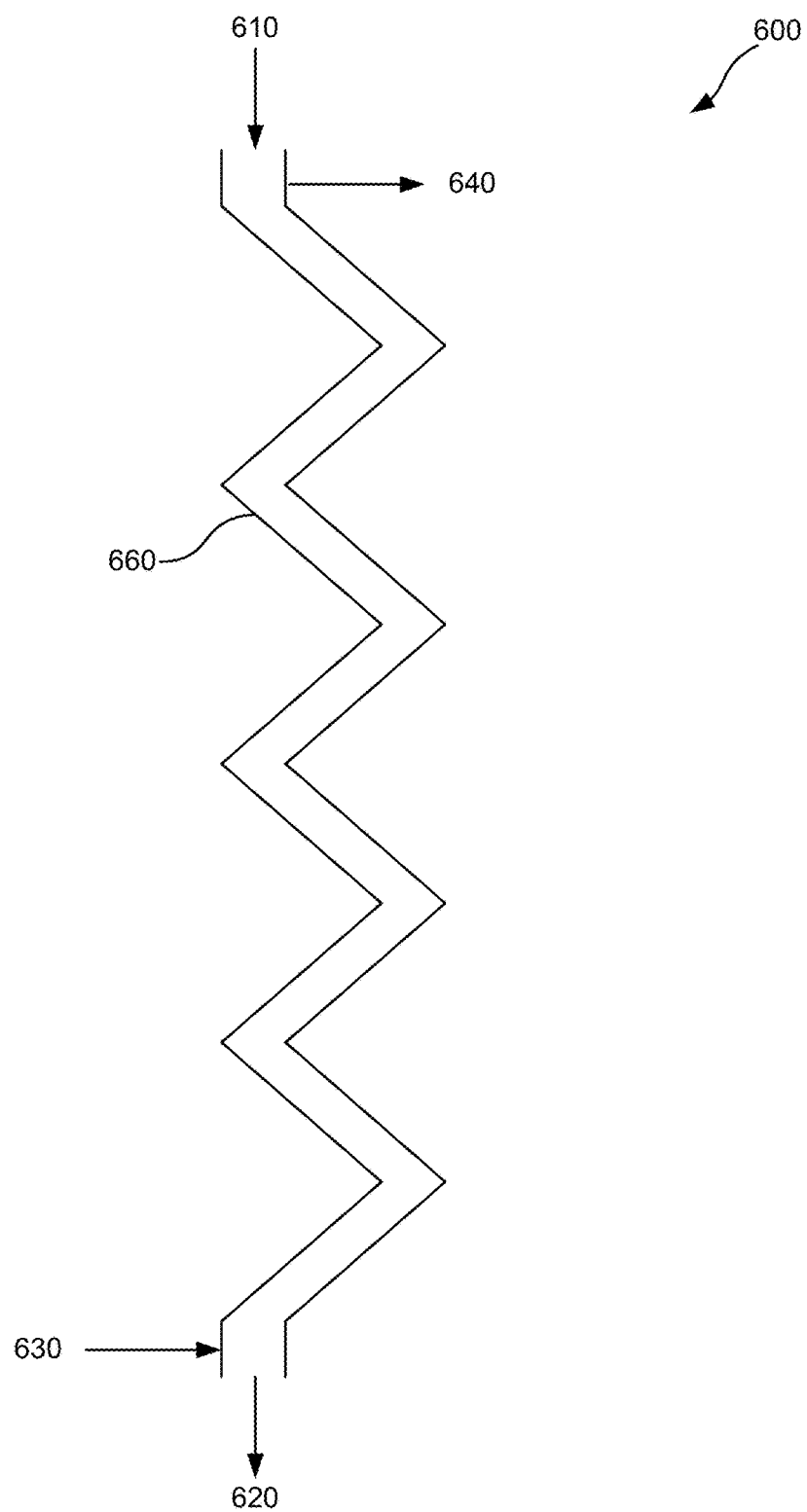
FIG. 6 shows a zig-zag contacting chamber having a rectangular cross-section. The zig-zag contacting column operates in much the same manner as the baffle plate column show in FIG. 5.
Figure 7:
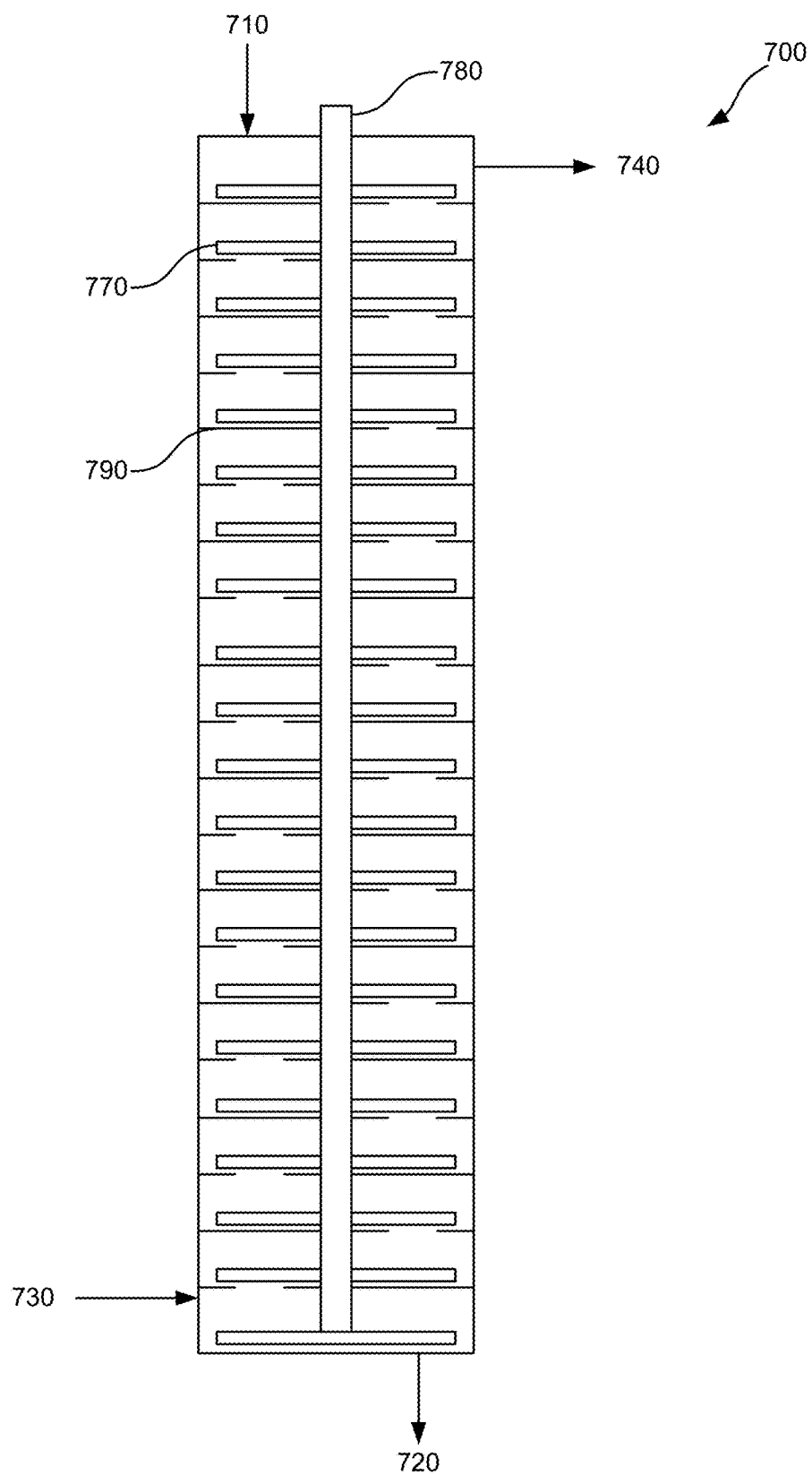
FIG. 7 shows a Bonatto-type contactor that uses moving rakes driven by a common shaft to sweep solids across stationary trays where the solids drop through orifices located on opposite sides of alternate trays.

Those skilled in the art will recognize that there are several means of accomplishing counter current contacting of solid sorbents and liquids, and thus many variations on the adsorption, regeneration, and rinse regions 102, 402, 104, 404, 106, 406. For example, FIGS. 5-7 depict three possible embodiments of contacting chambers that may be used to accomplish the adsorption, regeneration, and rinsing functions described in the discussion of FIGS. 1 and 4 above. In particular, the chambers 500, 600, and 700 can be used in any one or more of the adsorption, regeneration, or rinse regions 102, 104, 106, 402, 404, 406 as described previously. All three embodiments share the common features for counter current solids/liquid contacting wherein feed solids 510, 610, 710 are introduced at the top of the chamber 500, 600, 700 and discharged solids 520, 620, 720 exit the chamber 500, 600, 700 at the bottom. Solids descending through the chamber 500, 600, 700 under the influence of gravity are counter currently contacted with feed liquid 530, 630, 730 introduced at the bottom of the chamber 500, 600, 700. Discharged liquid 540, 640, 740 exits at the top of the chamber 500, 600, 700.

When implemented as an adsorption region 102, 402, feed solids 510, 610, 710 are comprised of fresh or regenerated and rinsed sorbent (e.g., non-loaded activated alumina). Discharged solids 520, 620, 720 are pregnant solid sorbent (e.g., activated alumina loaded with silica). Feed liquid 530, 630, 730 is pregnant liquor (e.g., silica-laden water), and discharge liquid 540 is barren liquor (e.g., treated water or silica-free water).

When implemented as the regeneration region 104, 404, feed solids 510 are comprised of pregnant solid sorbent (e.g., silica-loaded alumina), and discharge solids 520 are comprised of regenerated sorbent (e.g., non-loaded activated alumina). Feed liquid 530 is caustic regenerant solution (e.g., regenerant such as NaOH) plus pregnant rinse solution from the rinse region 106, 406. Discharge liquid 540 is concentrated adsorbate solution (e.g., waste fluid such as brine) that is discharged from the elongated vessel 101, 401.

In the rinse section of the column, feed solids 510 are comprised of regenerated sorbent (e.g., non-loaded activated alumina), and discharge solids 520 are comprised of regenerated and rinsed sorbent (e.g., non-loaded and rinsed activated alumina) that is then transported to the top of the adsorption region 102, 402 of the elongated vessel 101, 401. Feed liquid 530 is rinse water, and discharge liquid 540 is pregnant rinse solution (e.g., rinse water) that is comingled with caustic regenerant solution proximal to an interface between the regeneration and rinse regions 104, 106, 404, 406.

The simplest contacting column, or elongated vessel 101, 401, configuration is a vertical tube or shaft (FIGS. 1 and 4) through which sorbent media (e.g., activated alumina) descends in a semi-packed bed under the influence of gravity. Use of this type of contacting column is facilitated by sorbent media that exhibits particle density, particle uniformity, particle size, and void fraction sufficient to transmit counter-flowing water without particle fluidization or entrainment.

Sorbents comprised of particles of mixed or smaller grain size are subject to channeling or fluidization when used in a contacting column such as the ones described herein. FIGS. 5, 6, and 7 show three possible configurations for sorbent/liquid contacting chambers that are suitable for contacting sorbents with fine or mixed particle size distribution. These embodiments all share the common feature of providing a distinct number of contact stages.

FIG. 5 illustrates a contacting chamber fitted with inclined plates 560 installed at an angle greater than the transport angle of the sorbent media. Solids slide down the inclined plates to plate gaps and fall over a precipice of each plate in a thin sheet. The downward velocity of the falling sheet of sorbent is much greater than the Stokes settling velocity of any individual particle in the sheet. The falling sheet of solids is intercepted by counter flowing wash water (e.g., feed water or rinse water), having a substantial horizontal streamline component. The wash water partially fragments the falling sheet of solids and pushes it toward the outside wall of the column. Near the wall, the wash water streamline is forced back to upward vertical, creating a shear zone in the plate gap, between the falling and fragmenting sheet of solids and the rising wash water stream. Some of the falling solids are re-entrained by the upward flow of wash water and are carried into the interstitial volume above the plate.

The interstitial volume above each plate receives solids falling from the plate above and solids re-entrained by the wash water moving through the plate gap from below. In the interstitial volume above the plate, wash water moves in a substantially horizontal streamline across the column, to the next and lower gap, and above the bulk of the disbursed solids. This promotes settling and transport of solids down the plate. Sweep flock settling is the predominant mechanism in this region, with larger flocks and particles, carrying finer materials downward to the baffle plate and occluding them in the sheet discharge. In this manner, the concentration of solids in the region above the plate increases until the settling, transport, and sheet discharge reach steady state equilibrium with the solids feed rate. Each stage provides a turbulent contact zone and a quiescent settling zone. Downward transport of particles is not governed by Stokes law.

FIG. 6 shows a zig-zag contacting chamber having a rectangular cross-section. The zig-zag contacting column operates in much the same manner as the baffle plate column show in FIG. 5. The primary benefit to the zig-zag column is that it can better handle any gas generation from chemical reactions. Its primary disadvantage is that it does not provide as much volume for sweep-floc formation and settling.

FIG. 7 shows a Bonatto-type contactor that uses moving rakes 770 driven by a common shaft 780 to sweep solids across stationary trays 790 where the solids drop through orifices located on opposite sides of alternate trays. Solids fall downward through to tray orifices through up-welling liquid from the stage below. The primary advantage of the Bonatto-type contactor is that many more and larger contacting stages can be fit into a given column height, because the transport angle of the solids is not a factor in the design. The primary disadvantages are complexity, higher construction cost, and the need for internal moving parts.

Figure 2:
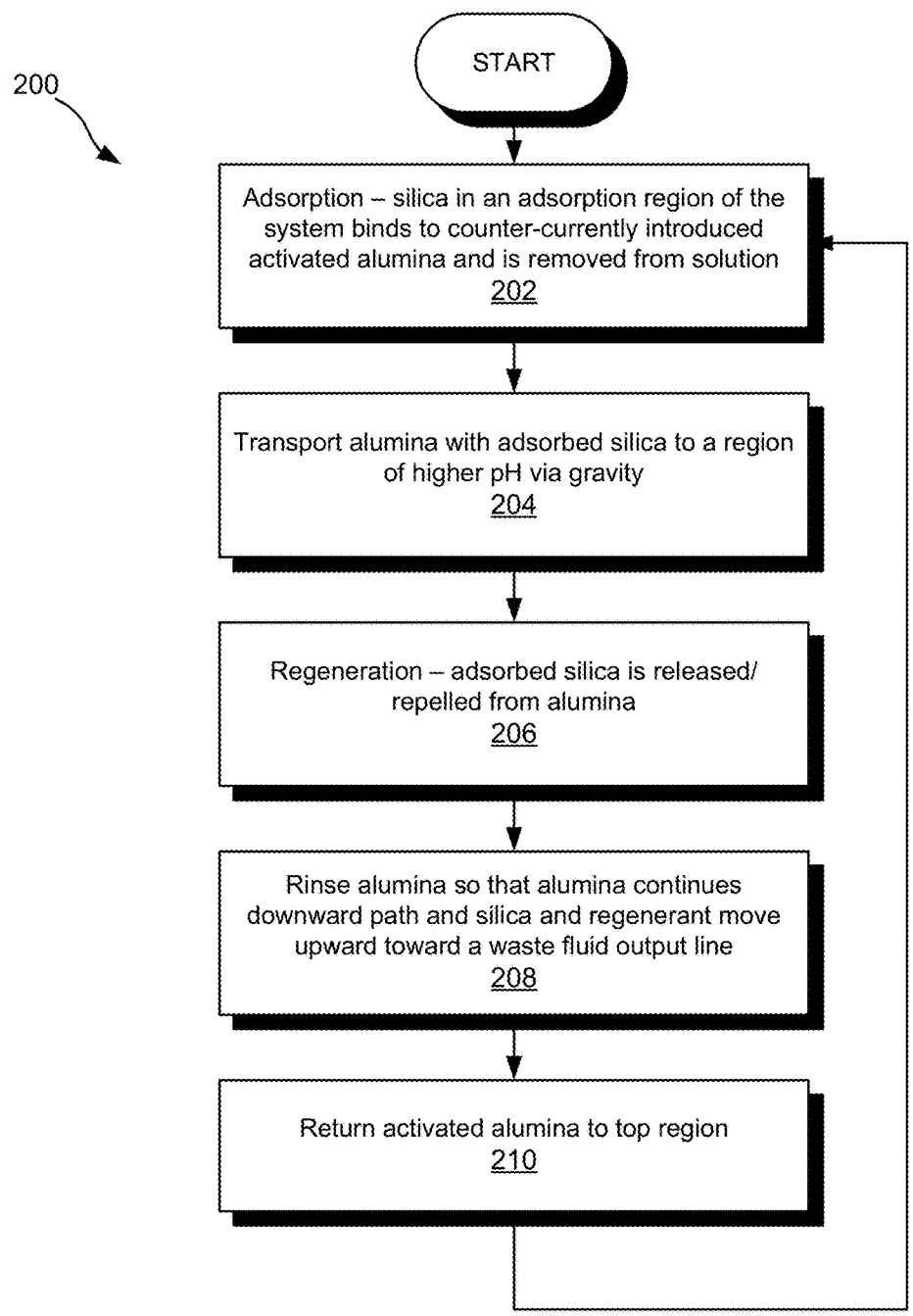
FIG. 2 illustrates a method for continuous-cycle treatment of wastewater comprising silica using reduced volumes of activated alumina as the adsorbent.

FIG. 2 illustrates a method for continuous-cycle treatment of wastewater comprising silica using reduced volumes of activated alumina as the adsorbent. The method 200 includes an adsorption portion 202, a regeneration portion 206, a rinsing portion 208, and various transport processes therebetween 204, 208, 212. The adsorption portion 202 involves counter-current mixing of activated alumina and a wastewater containing silica. The pH of the adsorption portion 202 is high enough to ionize silicic acid in the wastewater and form anionic silica, but low enough for alumina to have an electropositive surface charge and thus to adsorb the anionic silica. In particular, the pH can be lower than a point of zero charge for alumina, or a pH of between 8.0 and 8.7. Within this range, the pH can be selected such that a rate of anionic silica adsorption on the alumina is equal to or greater than a rate at which silicic acid is ionized into anionic silica. The counter-current mixing in the adsorption portion loads the alumina with silica, and the loaded alumina is then transported to a region of higher pH via gravity (Block 204). The regeneration portion 206 involves receipt of the loaded alumina and a lowering of the pH such that the silica releases from the alumina. This pH can be equal to or greater than the point of zero charge for alumina. The alumina can then be rinsed (Block 208) to push the released silica and regenerant in an upward path while the denser alumina descends via the force of gravity. The silica and regenerant can move upward until discharged via a waste fluid output line. Finally, the regenerated alumina can be returned to the top region to begin treating further waste water (Block 210).

Figure 3:
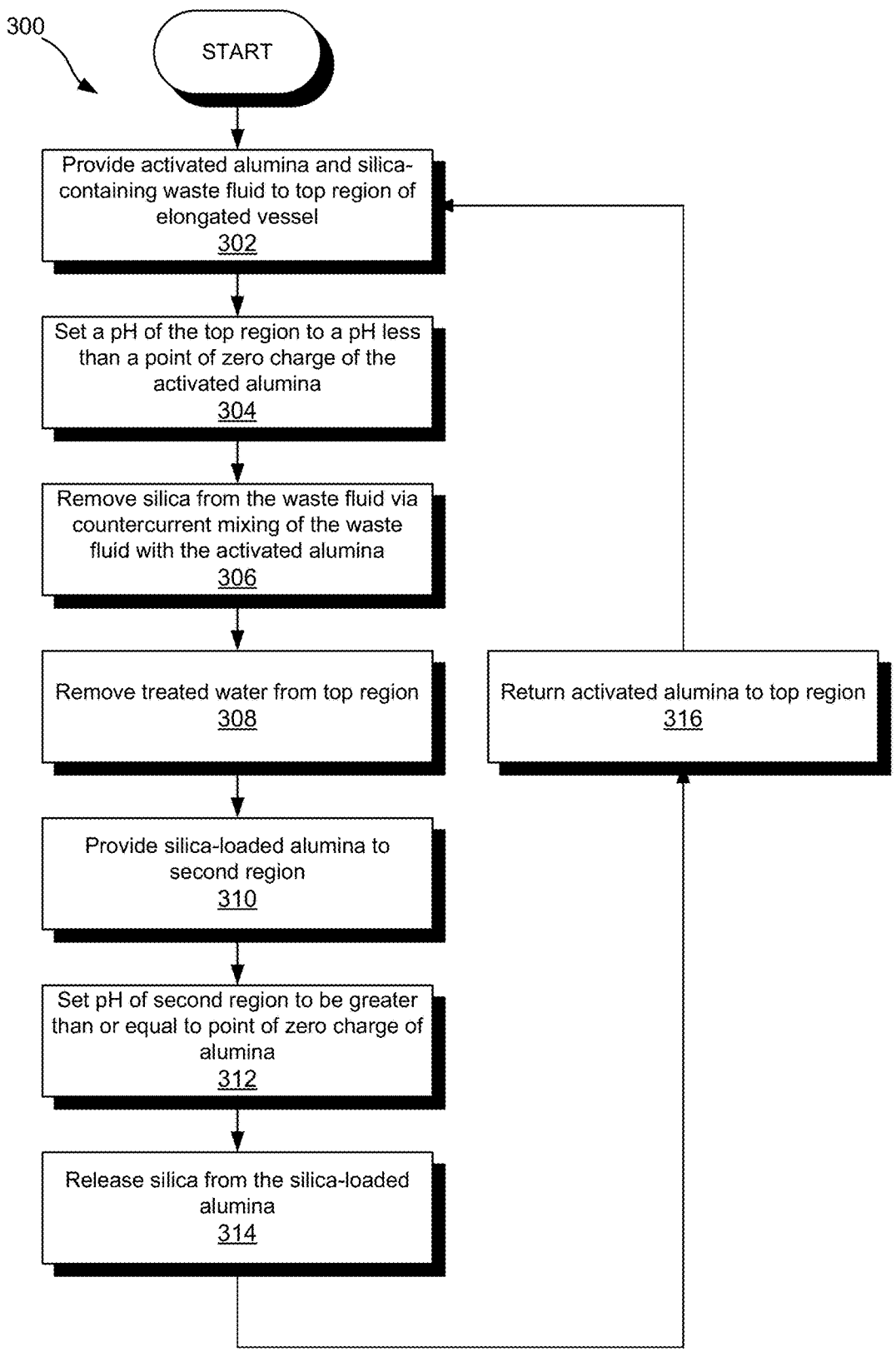
FIG. 3 illustrates a further embodiment of a method for continuous-cycle treatment of wastewater comprising silica using reduced volumes of activated alumina as the adsorbent.

FIG. 3 illustrates a further embodiment of a method for continuous-cycle treatment of wastewater comprising silica using reduced volumes of activated alumina as the adsorbent. The method 300 can start by providing activated alumina and silica-containing waste fluid to a top region of an elongated vessel (Block 302). The method 300 then sets a pH of the top region of the vessel to a pH less than a point of zero charge of the activated alumina (Block 304). For instance, a rate of regenerant and silica removed from a location at or proximal to an interface between the top region and a second region below the top region, can control the pH in the top region. A concentration indication controller can sense the pH in the top region and control a rate of removal of waste fluid including regenerant and silica. As a result of the pH, the method 300 removes the silica from the waste fluid via countercurrent mixing with the activated alumina (Block 306). More specifically, the waste fluid contains silicic acid and the pH converts the silicic acid to anionic silica. The pH also causes the activated alumina to have an electropositive surface charge. The result, is that the electropositive surface charge attracts the anionic silica thereby loading the activated alumina with silica. As the alumina loads with silica, the water continues moving upward in the top region and is removed at a point where the water is free of silica and can be considered treated water (Block 308). The silica-loaded alumina can be provided to a second region (Block 310), for instance the regeneration region 104, 404. The pH of the second region can be set to a value greater than or equal to the point of zero charge for alumina (Block 312), which in turn causes the silica to release from the silica-loaded alumina (Block 314) leaving regenerated alumina to continue descending in the vessel. The pH of the second region can be controlled by a rate of regenerant (e.g., NaOH) that is fed into the second region. The activated alumina can then be returned to the top region (Block 316), for instance via a solids transport path 114, 410. The method 300 then begins again by providing the activated alumina to the top region of the elongated vessel to interact with further silica-containing waste fluid (Block 302). In an embodiment, the top region is the adsorption region 102, 402.

Figure 8:
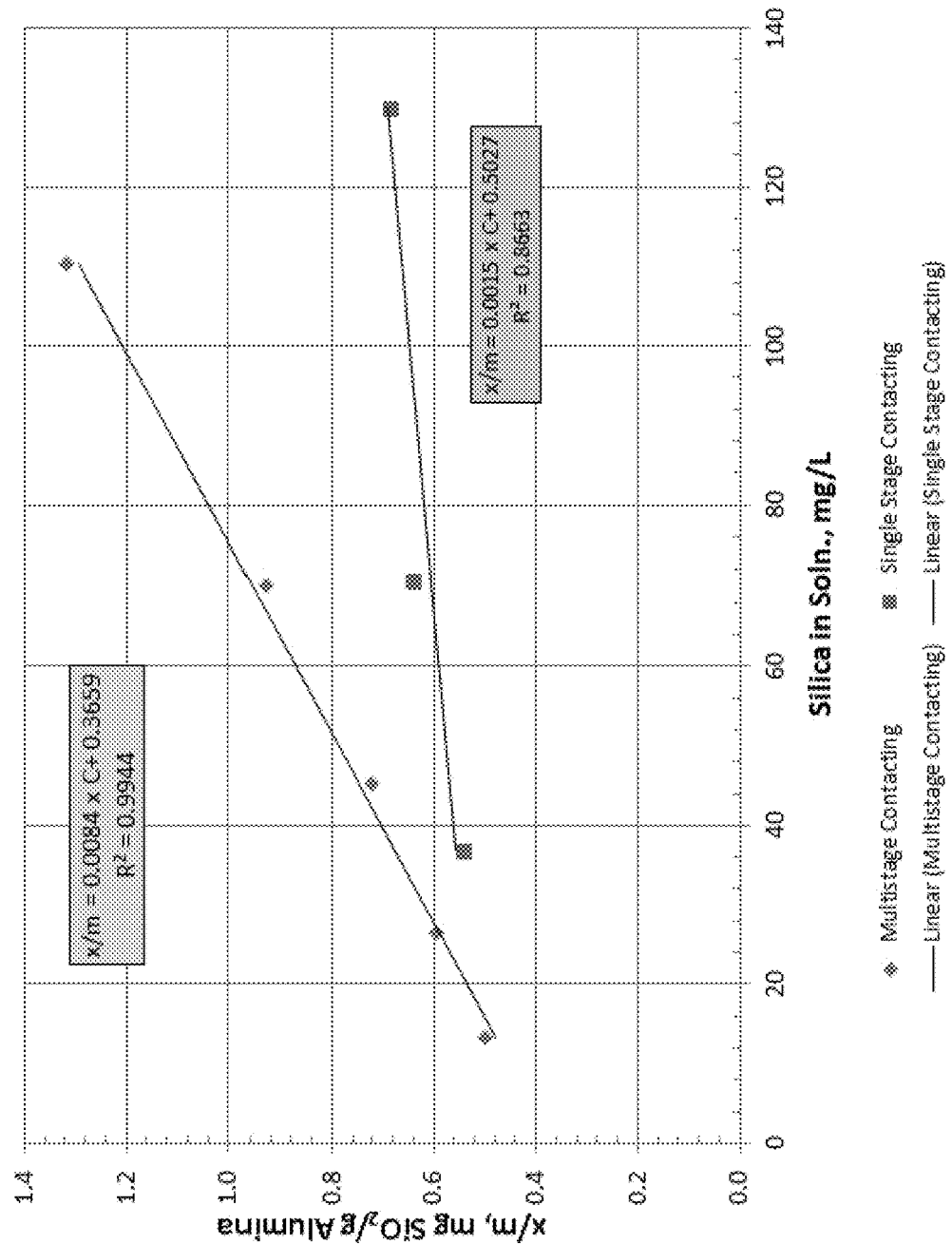
FIG. 8 shows adsorption isotherms for silica on alumina.

FIG. 8 shows adsorption isotherms for silica on alumina that illustrate the performance advantage of continuous countercurrent multistage contacting when compared to conventional single stage contacting of alumina with water containing silica. The adsorption isotherms show the silica loading on alumina (x/m), in milligrams $SiO_2$ per gram alumina, as a function of the concentration of silica remaining in the water after a 10-minute contact time.

Multistage countercurrent contacting was simulated in a 5-stage jar test run at an average pH of 8.5 (7.98<pH<8.8). The test was run starting with 300 ml of surrogate water (198 mg/L silica and total dissolved solids (TDS)=17,400 mg/L) in a Nalgene beaker. A 20-gram aliquot of activated alumina was added and mixed with a magnetic stir bar. At the end of 10 minutes, liquid was decanted from the alumina solids, filtered and sampled for analysis. The residual volume of the first stage filtrate was measured, mixed with 20 grams of fresh alumina, and the process was repeated for a total of 5 stages of contacting.

Total silica removal after 5 stages of contacting was about 93 percent. More importantly, measurements using a chloride ion specific electrode and conductivity meter indicated no detectable change in chloride concentration or total TDS during treatment. Therefore, it appears that activated alumina is almost perfectly selective for silica removal, even in the presence of brackish concentrations of TDS.

Single stage contacting was accomplished by adding, and mixing, 10, 20, and 30 gram aliquots of alumina to each of 3 beakers containing 100 ml of surrogate water. At the end of 10 minutes, liquid was decanted from the alumina solids, filtered and sampled for analysis.

Examination of FIG. 8 shows that multistage contacting allows much greater silica adsorption on activated alumina at elevated silica concentrations in solution, when compared to single stage contacting.

Figure 9:
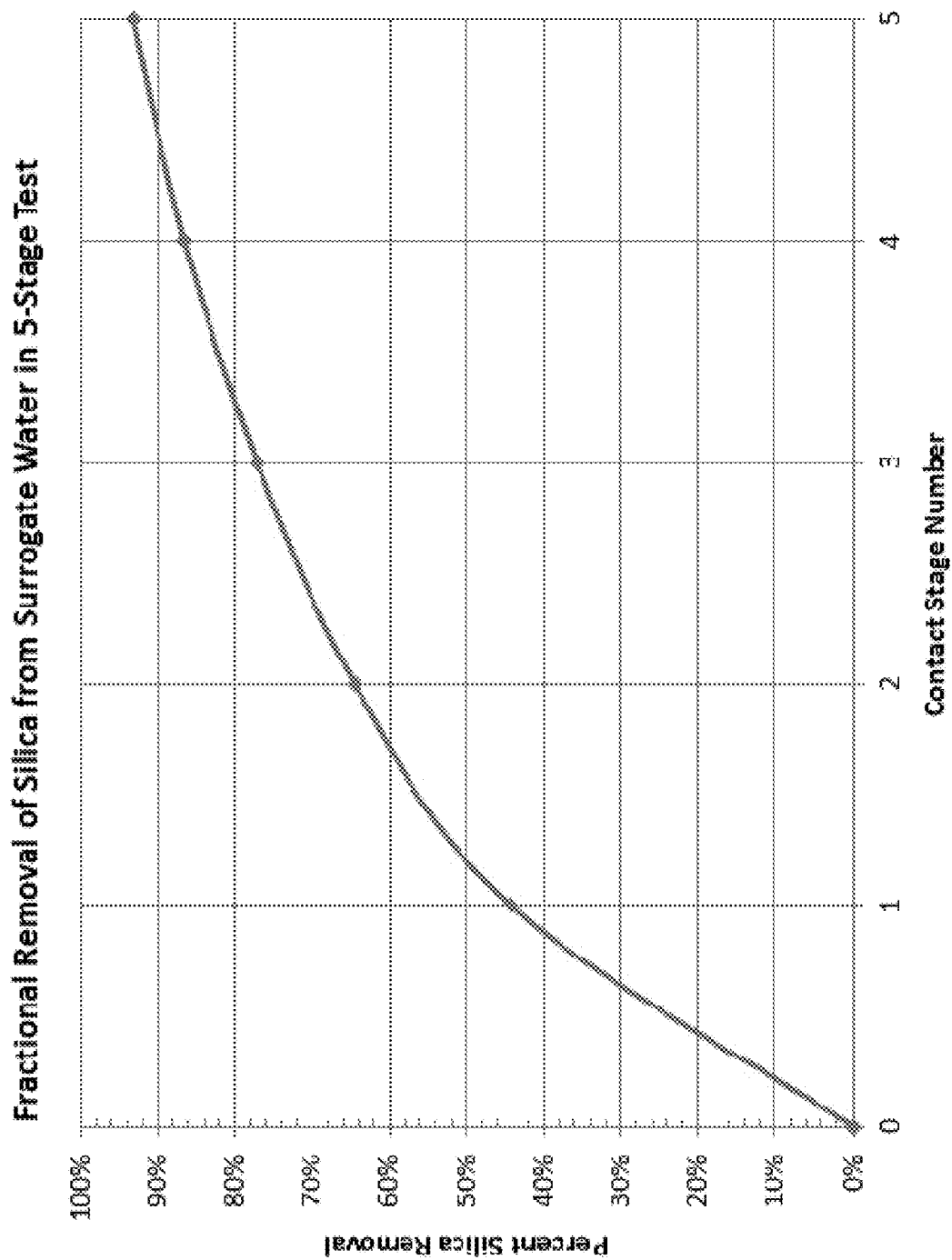
FIG. 9 shows further adsorption isotherms for silica on alumina.

FIG. 9 shows that high silica removal efficiencies can be obtained by multistage countercurrent contacting wherein water containing the highest concentration of silica is contacted with alumina having the highest silica loading, and barren alumina is used to polish silica from the cleanest water.

FIG. 9 also shows that silica removal efficiency is a function of the number of theoretical contact stages provided in the adsorption section of a continuous counter current contactor.

Figure 10:
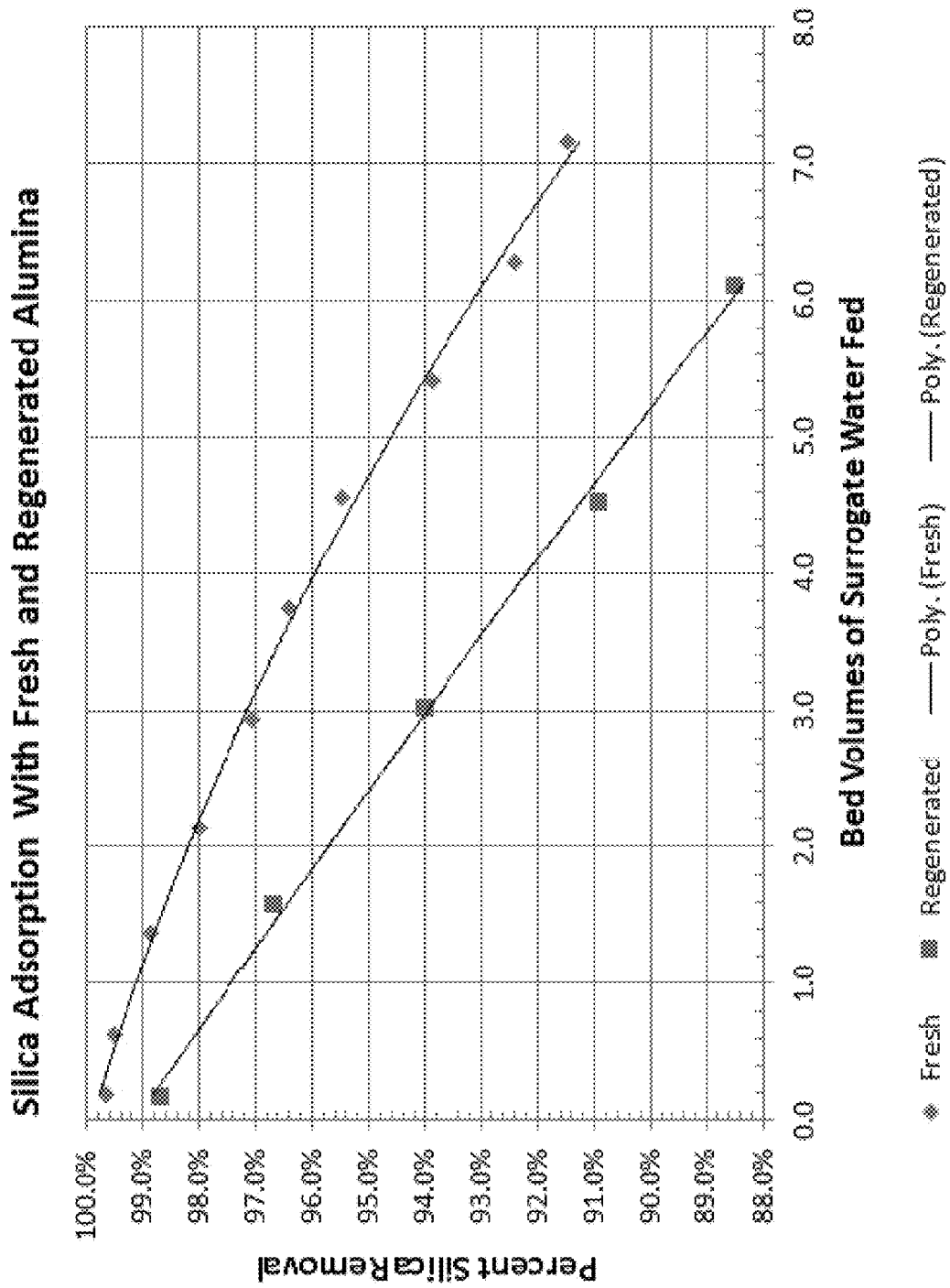
FIG. 10 shows further adsorption isotherms for silica on alumina.

FIG. 10 shows that alumina regenerated with NaOH can be used to adsorb silica from high-TDS aqueous solutions. Performance curves shown in FIG. 10 were generated using fresh activated alumina and alumina that had been saturated with silica and then regenerated with 0.5 N NaOH solution. All other experimental conditions were the same.

Figure 11:
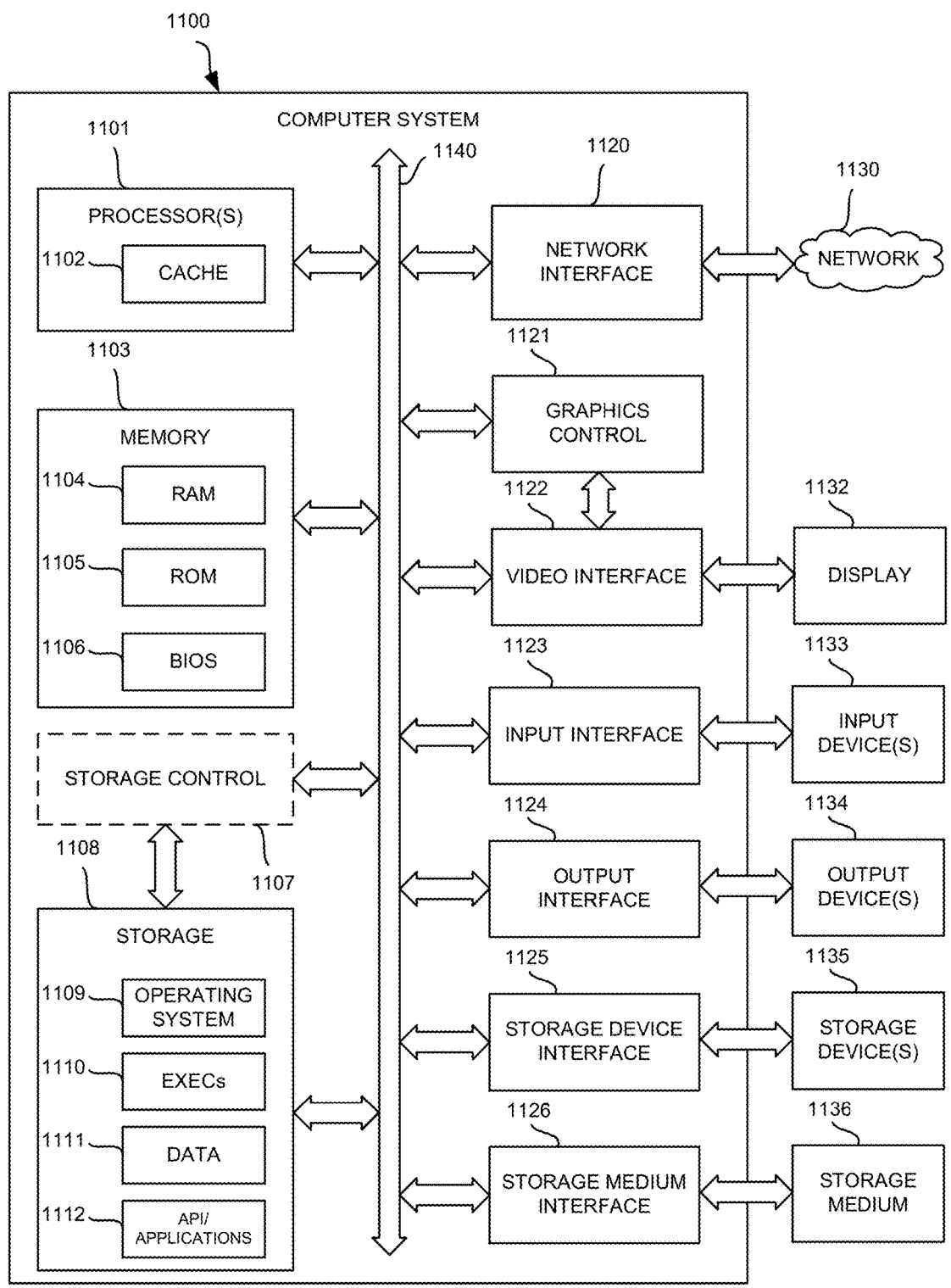
FIG. 11 shows a diagrammatic representation of one embodiment of a computer system within which a set of instructions can execute for causing a device to perform or execute any one or more of the aspects and/or methodologies of the present disclosure.

The systems and methods described herein can be implemented in a computer system in addition to the specific physical devices described herein. FIG. 11 shows a diagrammatic representation of one embodiment of a computer system 1100 within which a set of instructions can execute for causing a device to perform or execute any one or more of the aspects and/or methodologies of the present disclosure. A controller in the waste fluid flow control 108 in FIG. 1, or a controller in the rinse water flow control 110 is one implementation of the computer system 1100. The components in FIG. 11 are examples only and do not limit the scope of use or functionality of any hardware, software, firmware, embedded logic component, or a combination of two or more such components implementing particular embodiments of this disclosure. Some or all of the illustrated components can be part of the computer system 1100. For instance, the computer system 1100 can be a general purpose computer (e.g., a laptop computer) or an embedded logic device (e.g., an FPGA), to name just two non-limiting examples.

Computer system 1100 includes at least a processor 1101 such as a central processing unit (CPU) or an FPGA to name two non-limiting examples. The controller in the waste fluid flow control 108 in FIG. 1, or a controller in the rinse water flow control 110 is one implementation of the computer system 1100 is one implementation of the processor 1101. The computer system 1100 may also comprise a memory 1103 and a storage 1108, both communicating with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various non-transitory, tangible computer-readable storage media 1136 with each other and with one or more of the processor 1101, the memory 1103, and the storage 1108. All of these elements may interface directly or via one or more interfaces or adaptors to the bus 1140. For instance, the various non-transitory, tangible computer-readable storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1102 for temporary local storage of instructions, data, or computer addresses. Processor(s) 1101 are configured to assist in execution of computer-readable instructions stored on at least one non-transitory, tangible computer-readable storage medium. Computer system 1100 may provide functionality as a result of the processor(s) 1101 executing software embodied in one or more non-transitory, tangible computer-readable storage media, such as memory 1103, storage 1108, storage devices 1135, and/or storage medium 1136 (e.g., read only memory (ROM)). For instance, the method 200 and 300 in FIGS. 2 and 3 may be embodied in one or more non-transitory, tangible computer-readable storage media. The non-transitory, tangible computer-readable storage media may store software that implements particular embodiments, such as the methods 200 and 300 and processor(s) 1101 may execute the software. Memory 1103 may read the software from one or more other non-transitory, tangible computer-readable storage media (such as mass storage device(s) 1135, 1136) or from one or more other sources through a suitable interface, such as network interface 1120. The waste fluid flow control 108 or the rinse water flow control 110 can include an embodiment of the network interface 1120 for communicating with remote devices, for instance for remote monitoring and control of the system 100. The software may cause processor(s) 1101 to carry out one or more processes or one or more steps of one or more processes described or illustrated herein. Carrying out such processes or steps may include defining data structures stored in memory 1103 and modifying the data structures as directed by the software. In some embodiments, an FPGA can store instructions for carrying out functionality as described in this disclosure (e.g., the methods 200 and 300). In other embodiments, firmware includes instructions for carrying out functionality as described in this disclosure (e.g., the methods 200 and 300).

The memory 1103 may include various components (e.g., non-transitory, tangible computer-readable storage media) including, but not limited to, a random access memory component (e.g., RAM 1104) (e.g., a static RAM "SRAM", a dynamic RAM "DRAM, etc.), a read-only component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable non-transitory, tangible computer-readable storage media described below. In some instances, ROM 1105 and RAM 1104 include non-transitory, tangible computer-readable storage media for carrying out the methods 200 and 300. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable non-transitory, tangible computer-readable media described herein. Storage 1108 may be used to store operating system 1109, EXECs 1110 (executables), data 1111, API applications 1112 (application programs), and the like. For instance, the storage 1108 could be implemented for storage of pH parameters as described in FIG. 1 relative to controlling a pH of the adsorption region and the regeneration region 104. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130 (such as network for remotely monitoring and controlling the waste fluid flow control 108 and/or the rinse water flow control 110 in FIG. 1), computer system 1100 may communicate with other devices, such as mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combinations thereof.

In addition or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 200 and 300) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein

What is claimed is:

1. A continuous-cycle method of wastewater treatment via reduced volumes of activated alumina, the method comprising:
   providing activated alumina and a silica-containing waste fluid to a top region of a waste treatment vessel;
   setting a pH of the top region to a pH less than a point of zero charge of the activated alumina;
   removing silica from the silica-containing waste fluid via countercurrent mixing of the waste fluid with the activated alumina to form silica-loaded alumina and treated water in the top region;
   removing the treated water from the top region;
   providing the silica-loaded alumina to a second region;
   setting a pH of the second region to be greater than or equal to the point of zero charge of the silica-loaded alumina;
   releasing the silica from the silica-loaded alumina via the pH of the second region to reestablish the activated alumina; and
   returning the activated alumina to the top region.

2. The method of claim 1, wherein the second providing is gravity driven.

3. The method of claim 1, wherein the point of zero charge for the alumina is in the range $8.5 \leq pH \leq 9.5$.

4. The method of claim 1, wherein the pH of the top region is high enough to partially ionize the silica in the top region, yet low enough to convert the activated alumina to electropositive alumina such that the electropositive alumina adsorbs ionized silica.

5. The method of claim 4, wherein the pH of the top region is within the range 8.0-8.7.

6. The method of claim 1, wherein the pH of the second region is greater than or equal to the point of zero charge of the alumina.

7. The method of claim 6, wherein the pH of the second region is greater than 8.7.

8. The method of claim 7, wherein the pH of the second region is greater than 9.0.

9. The method of claim 1 further comprising controlling a rate that regenerant is removed from a line proximal to an interface between the top region and the second region to maintain an elevation of the interface.

10. The method of claim 1, further comprising controlling a rate that rinse water enters a bottom region, coupled to the second region, so that a predefined pressure difference at two different elevations in the third region, is maintained.

* * * * *